US012675791B1

(12) United States Patent
Kuyper

(10) Patent No.: US 12,675,791 B1
(45) Date of Patent: Jul. 7, 2026

(54) INTELLIGENT PROCESSING OF ELECTRONIC VALUE TRANSACTIONS IN TRUSTED EXECUTION ENVIRONMENTS

(71) Applicant: Openvest LLC, New York, NY (US)

(72) Inventor: Justin A. Kuyper, New York, NY (US)

(73) Assignee: Openvest Corp., Miami, FL (US)

( * ) Notice: Subject to any disclaimer, the term of this patent is extended or adjusted under 35 U.S.C. 154(b) by 339 days.

(21) Appl. No.: 17/899,572

(22) Filed: Aug. 30, 2022

(51) Int. Cl.
　*G06Q 20/40* (2012.01)
　*G06Q 20/06* (2012.01)
　*G06Q 20/38* (2012.01)

(52) U.S. Cl.
　CPC ....... *G06Q 20/4014* (2013.01); *G06Q 20/065* (2013.01); *G06Q 20/3825* (2013.01)

(58) Field of Classification Search
　None
　See application file for complete search history.

(56) References Cited

U.S. PATENT DOCUMENTS

| | | | | |
|---|---|---|---|---|
| 2022/0173893 A1* | 6/2022 | Basu | ...................... | H04L 9/3247 |
| 2022/0222655 A1* | 7/2022 | Jin | ................... | G06Q 20/38215 |
| 2022/0318788 A1* | 10/2022 | Dalton | ............... | G06Q 20/3829 |

FOREIGN PATENT DOCUMENTS

WO　　WO-2020143431 A1 *　7/2020　............ G06Q 40/04

* cited by examiner

*Primary Examiner* — Duan Zhang
*Assistant Examiner* — Nicholas K Phan
(74) *Attorney, Agent, or Firm* — PATENT LAW WORKS LLP

(57) ABSTRACT

System and methods for enabling blockchain transaction transfers in trusted execution environments created for designated processors. Transaction flow executes in aggregated packets in secure channels after they have been verified by all authorized processors within the trusted execution environment. The transfers are accomplished along established channels among verified processing devices. The system comprises a master processor that has access to all the trusted execution environments and is operable to intelligently tag transactions for off-chain processing as required and issue triggers to dispatch particular transaction packets to remote processors in the secure channels.

20 Claims, 9 Drawing Sheets

Figure 1:
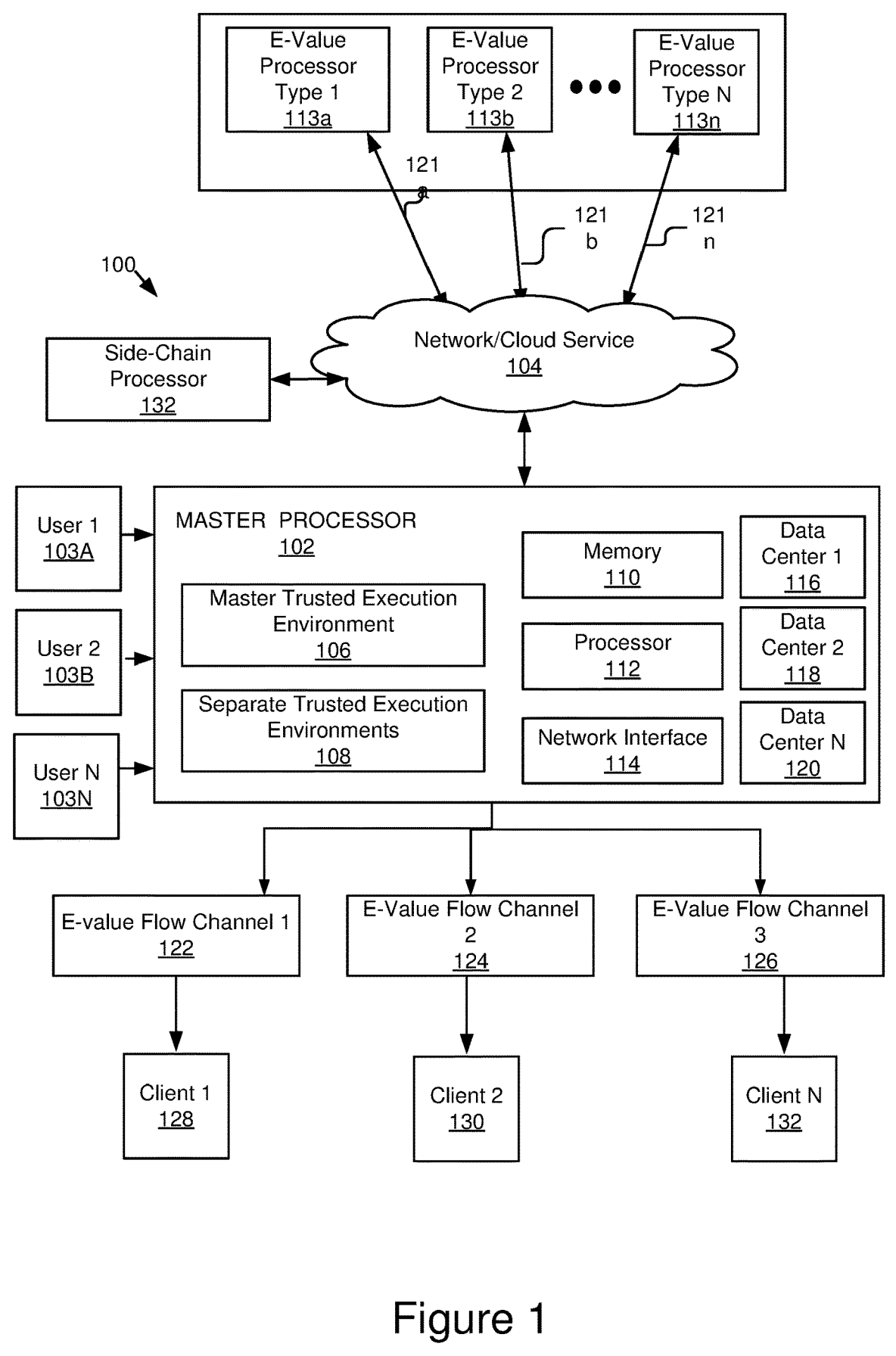

| E-Value Processor Type 1 113a | E-Value Processor Type 2 113b | • • • | E-Value Processor Type N 113n |
| --- | --- | --- | --- |

121

121 b 121 n

100

Network/Cloud Service 104

Side-Chain Processor 132

MASTER PROCESSOR 102

User 1 103A

User 2 103B

User N 103N

Master Trusted Execution Environment 106

Separate Trusted Execution Environments 108

Memory 110

Processor 112

Network Interface 114

Data Center 1 116

Data Center 2 118

Data Center N 120

E-value Flow Channel 1 122

E-Value Flow Channel 2 124

E-Value Flow Channel 3 126

Client 1 128

Client 2 130

Client N 132

MASTER SHARED
DATABASE     204

| Event Object & Tag Generator 208 |
| Access Controller 210 |
| Check-Point Object 212 |
| Private Keys 214 |

Memory
110

Processor
112

Network
Interface
114

Messaging Pipeline
206

Data Center 1
116

Data Center 2
118

Data Center N
120

Client
Channel 1
128

Client
Channel 2
130

Client
Channel N
132

300

400

INTELLIGENT PROCESSING OF ELECTRONIC VALUE TRANSACTIONS IN TRUSTED EXECUTION ENVIRONMENTS

BACKGROUND

1. Field of the Invention

The field of the invention relates generally to processing and routing secure transactions in distributed environments, and more particularly, to processing and routing digital transaction records in separate trusted environments within which only designated and authorized parties can execute actions after verification by all authorized parties engaged in a transaction or transfer.

2. Description of the Related Art

Blockchain protocols are used to transfer digital assets for exchanging payments in a secure and decentralized manner. Yet, it is widely recognized that blockchain protocols have drawbacks, as they typically require consensus by a large number of miners to validate transactions. The miners are those who can solve complex mathematical problems, who are then paid in tokens for their work. This type of blockchain system declares its legitimacy, by virtue of transparency and credibility due to the myriad miners involved. Although such blockchain systems are popular among the youth, they are criticized by seasoned financial experts and titans of industry. One reason is that resources are wasted in the interest of complete transparency. Widespread use of blockchain protocols as proposed so far cannot be sustained by the world's depleting resources. Another reason is that they result in latency by the amount of time it takes to reach consensus and expense. Yet another reason is the high degree of distributed replication, not only to overcome node failure and attacks, but to maintain records that are not modified. Therefore, all aspects of the blockchain protocols as they exist are not viable for use in the business in their current form. For example, companies and organizations in the financial technology ("FinTech") industry are looking to develop blockchain protocols, referred to as Distributed Ledger Technology, for "bank-to-bank" transactions. Increasing adoption will require higher performance. It is not clear that the technology as currently constructed can handle the transaction flow that will be required by FinTech operations. Most experts believe that is not feasible.

Accordingly, it would be desirable in large-scale operations, to tag critical transactions that can benefit from blockchain technology and process the less critical transactions off-chain. For example, transactions that have been replicated and verified in external processing operations would require less processing. There is a dire need for practical solutions to use blockchain protocols effectively for financial transactions and transfers.

SUMMARY

Illustrative embodiments of the present invention provide a way to create and execute payment transactions and transfers using blockchain protocols within trusted execution environments that are created for different entities or activities involved in the flow of transactions and payments. The illustrated embodiments advantageously execute payment transfers (e.g., amounts directly received or aggregated amounts) by digital records, with low latency and intelligent processing. The payment transfers and associated digital records flow in secure channels that are dynamically created and tagged by an intelligent master processor, in every instance that a group of verified participants (e.g., clients, vendors, partners or the like) is identified. The secure channels may be used for verified clients or verified activities.

In some embodiments of the present invention, a secure transaction channel is established in a trusted execution environment, which allows access to only verified blockchain participants. In one embodiment, a trusted computing environment includes a first "master" processing device (intelligent module) comprising a processor coupled to a memory. The first master processing device ("master processor") is operable to communicate over a network (one or more) with a plurality of remote processing devices (e.g., clients or partners) with a processor and a memory, respectively, in a distributed architecture. In one transaction execution scenario, the first master processing device is accessible to a first aggregator participant and a first trusted execution environment. The first trusted execution environment permits flow of transactions or payments in a first payment channel with a second trusted execution environment of the second processing device (e.g., of a particular client). The first master processing device is configured to receive and associate one or more value deposits from a set of users (e.g., individuals or entities) within the first payment channel, initiating an authorized blockchain transaction. This authorized blockchain transaction may receive validation from an off-chain verification operation by external processors (the bank or financial entity that made the value deposit for the user and the bank that received the value deposit). The first master processing device is further operable to receive value deposits from multiple users associated with the first payment channel and to aggregate them. The master processor designates or "tag" transactions for off-blockchain transactions between the master processors and other distributed processing devices. The purpose is to allocate resources intelligently and avoid unnecessary replication of operations.

In accordance with the present invention, the first payment channel is one of many consecutive payment channels sequentially established in a first trusted execution environment. Some embodiments are advantageously configured to provide a full-duplex payment channel framework that exploits trusted execution environments. Such embodiments can be deployed securely, on private networks, to achieve higher transaction transmission and lower transaction latency, to enable unlimited full-duplex payments as long as the balance does not exceed the channel's credit, to require only a single message to be sent per aggregated payment in any direction, and to place transactions on the blockchain under any execution scenario.

Illustrative embodiments include high-performance micropayment protocols that support practical, secure, and efficient fund transfers on a network. For example, some embodiments may require multi-signature, time-locked transactions to establish secure payment channels between two mutually distrusting parties. Creating such trusted execution environments allows the framework to provide guarantees to its participants and enables channel reuse as long as the balance does not exceed the channel limits. Also, this framework is both time-efficient and resource-efficient, requiring only one-way messages for sending digital payments and transactions to be placed on the blockchain.

In some embodiments, off-chain payment protocols may receive deposit amounts, that are collected into larger amounts and routed for transfer via trusted execution environments, to perform secure, efficient and scalable fund transfers on a blockchain architecture, with asynchronous blockchain access. Such embodiments illustratively utilize secure payment chains to route payments across multiple payment channels. An example implementation may use Intel Software Guard Extensions ("SGX") as the trusted execution environment and a private network of an organization developed in a cloud architecture. One possible implementation of this type may enable higher frequency of transactions for large-scale operations.

These and other embodiments of the invention include but are not limited to systems, methods, apparatus, processing devices, integrated circuits, and processor-readable storage media having software program code embodied therein.

BRIEF DESCRIPTION OF THE DRAWINGS

The present invention is illustrated by way of example, and not by way of limitation in the figures of the accompanying drawings, in which like reference numerals generally indicate identical, functionally similar, and/or structurally similar elements, and wherein:

FIG. 1 shows a distributed architecture of a financial transaction system in which digital transactions (e.g., value payments) and records flow with sequentially set up channels constructed in trusted execution environments.

DETAILED DESCRIPTION

Figure 2:
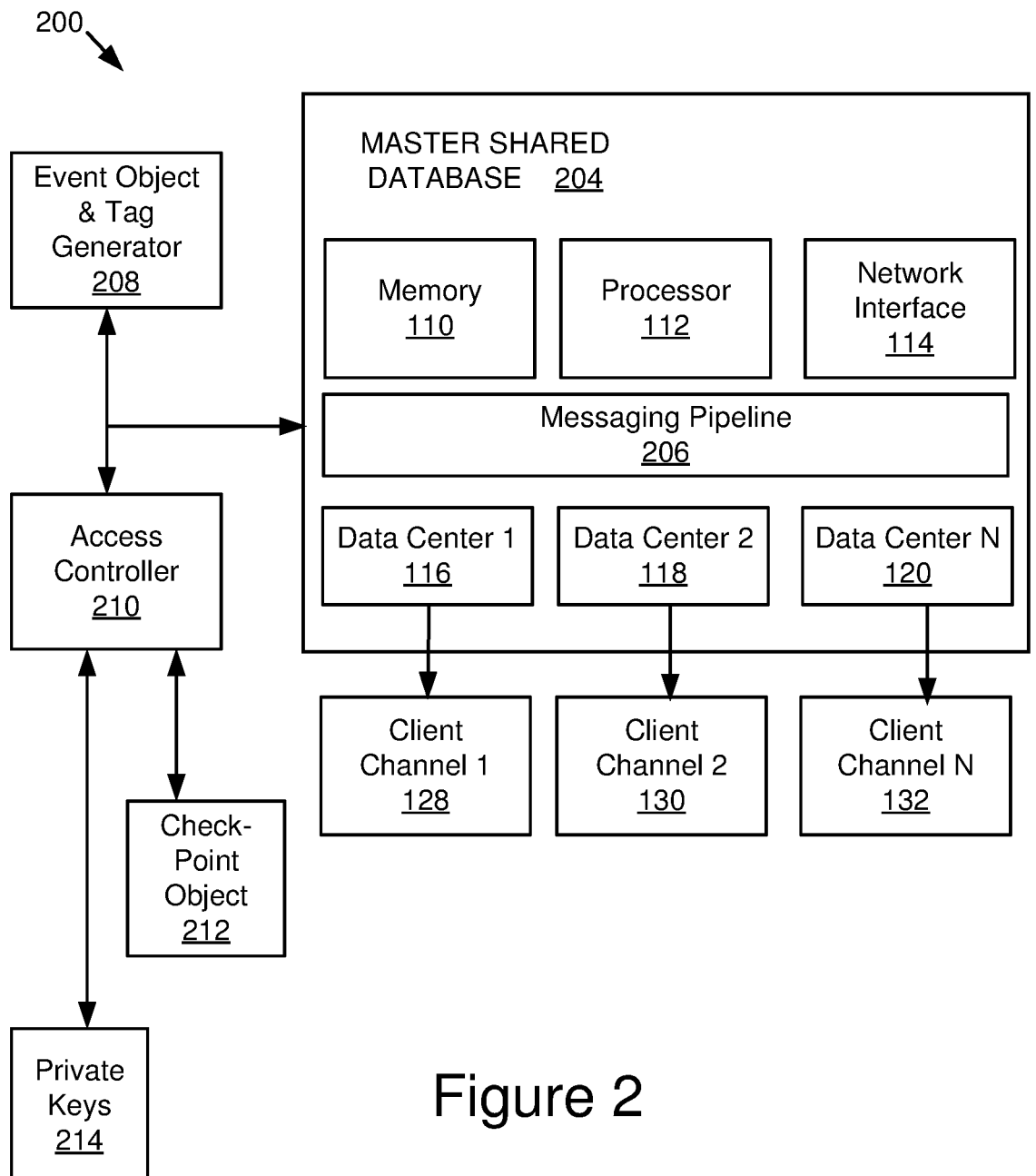
FIG. 2 illustrates an example master shared database operable to tag transactions for processing in secure channels created in trusted environments.

According to some embodiments of the present disclosure, a trusted transaction processing interface system, (herein the "TTPIS system"), facilitates creating, deploying, and managing value-related transaction objects in micro amounts or aggregated macro amounts. The micro or macro amounts of value are electronic value digital records, otherwise referred to as "E-Value" designations. E-Value amounts of many users or persons may be assembled and intelligently processed in trusted environments created between trusted processing devices or for designated activities. Packets of E-Value of varying amounts may be processed and sequentially deployed in secure transaction channels based on determining a context schema. The E-Value transfers or transaction may be recorded in distributed ledgers and other similar arrangements that are collectively maintained by multiple processing devices performing cryptographic operations involving interrelated data blocks.

Records in the distributed ledgers are released after restricted sets of users designated for participation in building consensus validate the record.

The TTPIS system may use context schema to determine the constraints on the blockchain object. For example, the context schema may specify who, when, where, what, why and how for interactions with the blockchain object. In an example, TTPIS the system may store a configuration file, an instance of the context schema for each event object. The TTPIS system may use the context schema to determine the persona type who may act on the event object. In an example, the context schema may describe a hierarchy of event objects, state, action, persona, role and other contextual information along with the history of the event. The TTPIS system may use an instance of the context schema, i.e., a configuration file for each blockchain object.

The TTPIS system 100 is illustrated in a distributed environment in which it operates. The TTPIS system 100 creates or provides an interface between events that occur in the environment illustrated including events within the environment as well as events occurring external to the environment, but affecting the transaction flow. The events are tracked sequentially in a blockchain format. Additionally, the TTPIS system 100 can monitor a state of the event objects created in a sequence. Based on the state of any given event object, the TTPIS system 100 or its master processor 102 controls subsequent interactions. The interactions among the event objects flow as messaging addressed and directed to event objects. The TTPIS system 100 also provides an interface between an event object and an event that may affect the event object on a cloud service 104. Further, the TTPIS system 100 has a messaging pipeline on which any component may request information.

An event object may be designated as a "check-point" (FIG. 2) in a processing sequence, and includes a set of intelligent code, which specifies predetermined terms and conditions that must be met before any subsequent action is automatically executed. The event objects that serve as checkpoints may be tagged to be executed in a trusted environment and dynamically requesting consensus from designated processors before proceeding to the processing event. In some instances, side-chain or off-chain processing may be requested from within a check-point object. A side-chain machine-readable instruction, that either executes within a separate trusted container may be a public source of verified data, communications to which flow via secure channels, to provide additional functionality or information to one or more blockchain objects. The context schema may describe the constraints on interactions of a blockchain object.

The check-point event object may be operable in two ways, one with code capable of being executed on a node of a network 104 monitoring the sequence of events, and one without code. Examples of constraints that formulate the terms and conditions, may include state, persona, role, action, and parameters of an action associated with the event object. The check-point objects may be designated by the activity it undertakes. In one example, an event object may be designated a "regulator" configured to regulate an interaction between two or more participants for a specified objective. A participant may be a participant of the system 100 with a specific objective with respect to the sequent of event objects processed by the system 100. An example of a specific objective may be monitoring or validating transmission of E-Value transactions between different organizations to comply with the specifications and conditions accorded to the transmission. The regulator event object may regulate an interaction based on constraints defined in machine-readable instructions. The regulator object may serve as the check-point object and save an immutable record of the interaction and critical events leading to with consensus on a distributed ledger or on a new sequence of events for processing. The new sequence would drive the next phase in the processing.

Check-point objects may have programs stored that are operable to run automatically when predetermined conditions are met. They are used to automate the execution of an agreement so that all participants can be immediately certain of the outcome, without any intermediary's involvement or any loss of time. Such programs can automate a workflow, triggering the next action when conditions are met. In some embodiments, a sequence of check-point objects may be separately stored and reviewed by the master processor.

The check-point object may contain machine-readable instructions (e.g., code) that governs the interactions of the check-point object and saves its current state (reflected related states of other events). This check-point object identified by a unique address may store its state in a data store assigned by the master processor 102 or outside the system 100. In some embodiments, it may separate interactions as relevant to the participants and filter them for each participant of the system 100. In the interest of intelligent use of resources and conserving expense, records of value to each participant are transmitted for storage to each participant processor with a linked identifier. If there is any action that is fraudulent, a quick request by the master processor to each participant processor can quickly assemble the state in a matter of seconds.

The events sequence processed in real-time may receive events associated with a context schema filter by messages addressed to the unique address. The check-point event object may store its change after execution of an action. Events for consideration by the check-point object may queue external events as the events arrive and assign one or more services to process the external events. For example, the TTPIS system 100 may allow integration of an enterprise banking system that can perform operations such as money transfers and loan/credit approval processing and report the transaction to the TTPIS system 100.

The TTPIS system 100 may utilize a context schema to provide context to the logic (e.g., machine-readable instructions) expressed in the check-point event object, for example, to automatically generate an application programming interface and dynamically update it. The application programming interface may be used to allow interaction with the check-point event object through a webpage, mobile page or a "bot" or the like. In yet another example, the TTPIS system 100 may generate a user interface that allows a participant to interact with an event object based on a context schema. The context schema may describe the specifications of the event object and constraints for interacting with it. For example, a context schema may describe the current status of the event object, the possible state transitions from the current state to another, the "participants" who may interact with the event object (authorized or validated entities), etc. In yet another example, the context schema may be saved in a "configuration" or "settings" file. Also, the configuration or settings file may include details of the unique identifiers associated with the event objects, the channels they are transmitted on etc.

Participants (Users 1-N and Clients 1-N) may interact with the TTPIS system for E-value transactions via a user interface generated by the TTPIS system 100. In some embodiments, the TTPIS system 100 may generate graphical user interfaces ("GUIs") based on the current, previous, or future state or action in an event object or by context schema etc. The events objects are set up in the instance an event is detected by the system TTPIS 100. In some embodiments, a user (User 1-N) may be one seeking to allocate E-Value for investment and growth. The GUI may enable authentication of participants using a simplified login with a username and password. The system may match the off-chain identity of the participant with the blockchain identity of the participant to valid the digital record before processing proceeds to the next phase. The user devices (1-N) may any of handheld devices, consumer electronics, general-purpose computers, specialty computing devices, etc.

The communications network 104 represents one or more networks collectively represented by network 104 in the FIG. 1. The network 104 may be integrated with a cloud platform or service, to which the other distributed computing devices are linked. The network 104 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The TTPIS system 100) comprises the master processor 102 and is coupled to the User devices (1-N), indicated by reference numerals 103A, 103B, and 103C. The master processor 102 creates a master trusted execution environment 106 and separate trusted execution environments 108 for processing sequences of event objects based on designations or tags accorded by the master processor 102. The master processor 102 may be a distributed computing device as illustrated here, which may fall in any of the categories such as "workstation," "server," "laptop," "handheld device," etc. The computing device typically includes a variety of non-transitory computer readable media. By way of example, and not limitation, computer readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device. Computer storage media does not, however, include propagated signals. Rather, computer storage media excludes propagated signals. Any such computer storage media may be part of computing device. The master processor 102 further comprises memory 110 including computer storage media in the form of volatile and/or nonvolatile memory. The memory may be removable, non-removable, or a combination thereof. Examples of hardware devices include solid-state memory, hard drives, optical-disc drives, etc.

One or more processors, shown as a single processor 112, read data from various entities such as the memory 110 or I/O components connected via a network interface 114. The memory 110 may stores, among other data, one or more operating applications. The applications, when executed by the one or more processors 110, operate to perform functionality on the master processor 102. The applications may communicate with complementary or external applications or services such as web services accessible via the network 104. The applications may represent client-side applications for downloading that couple to server-side operations executing in the cloud 104. Distributed applications typically have server-side modules executing in a cloud responsive to input and/or interaction received via client-side interactions in the application. It should be recognized that application instances may collaborate with data sources and other computing resources in the cloud 104 during operations, and may share and/or aggregate data between client-side services and cloud services as needed to save resources and avoid redundant actions.

The processor 112 may comprise, for example, a microprocessor, an application-specific integrated circuit (ASIC), a field-programmable gate array (FPGA), a central processing unit (CPU), an arithmetic logic unit (ALU), a graphics processing unit (GPU), a digital signal processor (DSP), or other similar processing device component, as well as other types and arrangements of processing circuitry, in any combination.

The memory 110 stores software program code for execution by the processor 112 in implementing portions of the functionality of the master environment processor. For example, at least portions of the functionality in the trusted execution environments 106 and 108 may be implemented using program code stored in memory 110.

A memory 110 that stores such program code for execution by a corresponding processor 112 is an example of a processor-readable storage medium having program code embodied therein, and may comprise, for example, electronic memory such as SRAM, DRAM or other types of random-access memory, read-only memory (ROM), flash memory, magnetic memory, optical memory, or other types of storage devices in any combination. Embodiments of the invention may be implemented in the form of integrated circuits comprising processing circuitry configured to implement processing operations associated with one or both of the trusted execution environments 106 and 108, as well as other related functionality. The network interface 114 is configured to allow the trusted execution environments to communicate over the network 104 with other system elements. The network interface 114 may comprise one or more conventional transceivers.

In operation, the master processor 102 interacts with remote client processors to establish E-Value flow in established channels (Channel 1-N, designated as 122, 124, and 126). The data centers 1-N, designated as 116, 118, and 120, respectively, may record filtered data by channels or clients (1-N, designated as 128, 130, and 132), as designated by the master processor 102. These may include multiple off-chain or side transactions that are essential to past, present, or future actions. In some embodiments, the E-Value flow channels are bidirectional channels, permitting E-Value flow in either direction.

Each of the trusted execution environments are accessible by private keys for each of the unique addresses. These private keys may be dynamically accorded and revoked by the master processor 102 in circumstances where a consensus commands such action. In addition, each channel remains locked, until released by a consensus trigger provided by the master processor 102. When the channel is unlocked, there is an instant update of the E-Value balance for all participants. The details are described in FIG. 9. The first E-Value flow channel (Channel 1) is established between trusted execution environments of respective pairs of the processing devices, for example the master processor 102 and the processors of Client 1 (reference numeral 128). Similarly, the second E-Value flow channel (Channel 2) is established between trusted execution environments of respective pairs of the processing devices, for example the master processor 102 and the processors of Client 2 (reference numeral 130). The first E-Value flow channel (Channel N) is established between trusted execution environments of respective pairs of the processing devices, for example the master processor 102 and the processors of Client N (reference numeral 132).

It should be recognized that the E-Value processors (113*a*, 113*b*, and 113*n*) as illustrated represent any type of payment processor, by which value may be added to an E-Value account. The E-Value may be via any payment channel, including financial transactions associated with the Society for Worldwide Interbank Financial Telecommunication ("SWIFT") network, credit card, cryptocurrencies, or digital payment (e.g., PayPal, etc.). It should be appreciated by those skilled in the art that the maximum transaction throughput of a cryptocurrency is determined by the block size and the block interval. With a block size of 1 MB and an average block interval of 10 minutes, a cryptocurrency can support a maximum of 7 transactions per second (tx/s). Recent proposals are in progress for increasing the block size or reducing the block interval, or alternatively, modifying the protocol, by incrementally creating blocks so as to avoid centralization bottlenecks and increase transmission rate.

The TTPIS system provides an effective and intelligent E-Value micropayment/aggregation protocol that prevent wastage of resources and supports secure and efficient transaction transfers. The current implementations of TTPIS provides confidentiality, trust, and integrity guarantees for code and data. No participant has access to more E-Value than their current net balance. The TTPIS system, by its master processor 102 ensures that the private keys that control the E-Value flow channels are never exposed to untrusted software or hardware and all sensitive operations are performed in the master trusted execution environment, ruling out a large class of potential attacks.

Referring now to FIG. 2, various components of the TTPIS are illustrated and described. The master processor 102 has access to a master shared database 204 with access to the memory 110, processor 112, and the network interface 114. The messaging pipeline 206 facilitates internal messaging among the components of the master processor 102 and the master shared database 204. The access controller 210 controls access to the master shared database 204 based on messaging from the check-point object 212. The event object and tag generator 208 generates an object for each event and a tag to designate which trusted environment the object should process in, for example, certain functions are more securely performed within the master execution environment and the others in the client execution environments. The access controller 210 also controls access to trusted client environments by private keys 214. In some scenarios, private keys may be used with public key pairs when access to shared resources is beneficial in some instances.

Figure 3:
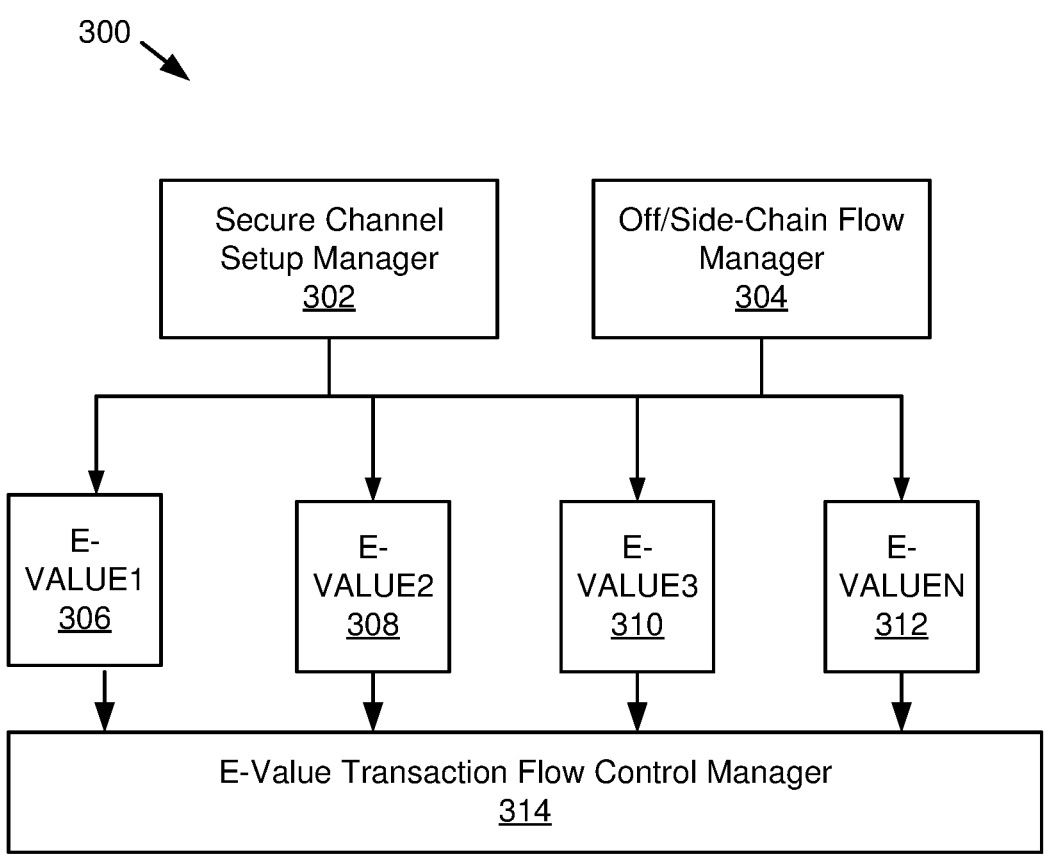
FIG. 3 is a block diagram illustrating sequential secure channels set up for flow of digital transaction records.

FIG. 3 illustrates a block diagram 300 illustrating operations by the master processor 102 performed in the master trusted execution environment 106. The master processor 102 comprises a secure channel setup manager 302, which is a software module with instructions to set up or create secure channels for E-Value flow (Channels 1-N illustrated in FIG. 1). The master processor 102 further comprises an offside-side chain flow manager 304 to track and process object events flowing in from external sources (external to the TTPIS system). E-Value amounts are set up sequentially, as illustrated by the containers "E-VALUE1" 306, "E-VALUE2" 308, "E-VALUE3" 310, "E-VALUEN" 312. The master processor 102 further comprises the E-Value transaction flow control manager 314, which controls the unlocking mechanism to release E-Value packets (with either micro amounts of E-Value or macro amounts of aggregated E-Value).

Figure 4:
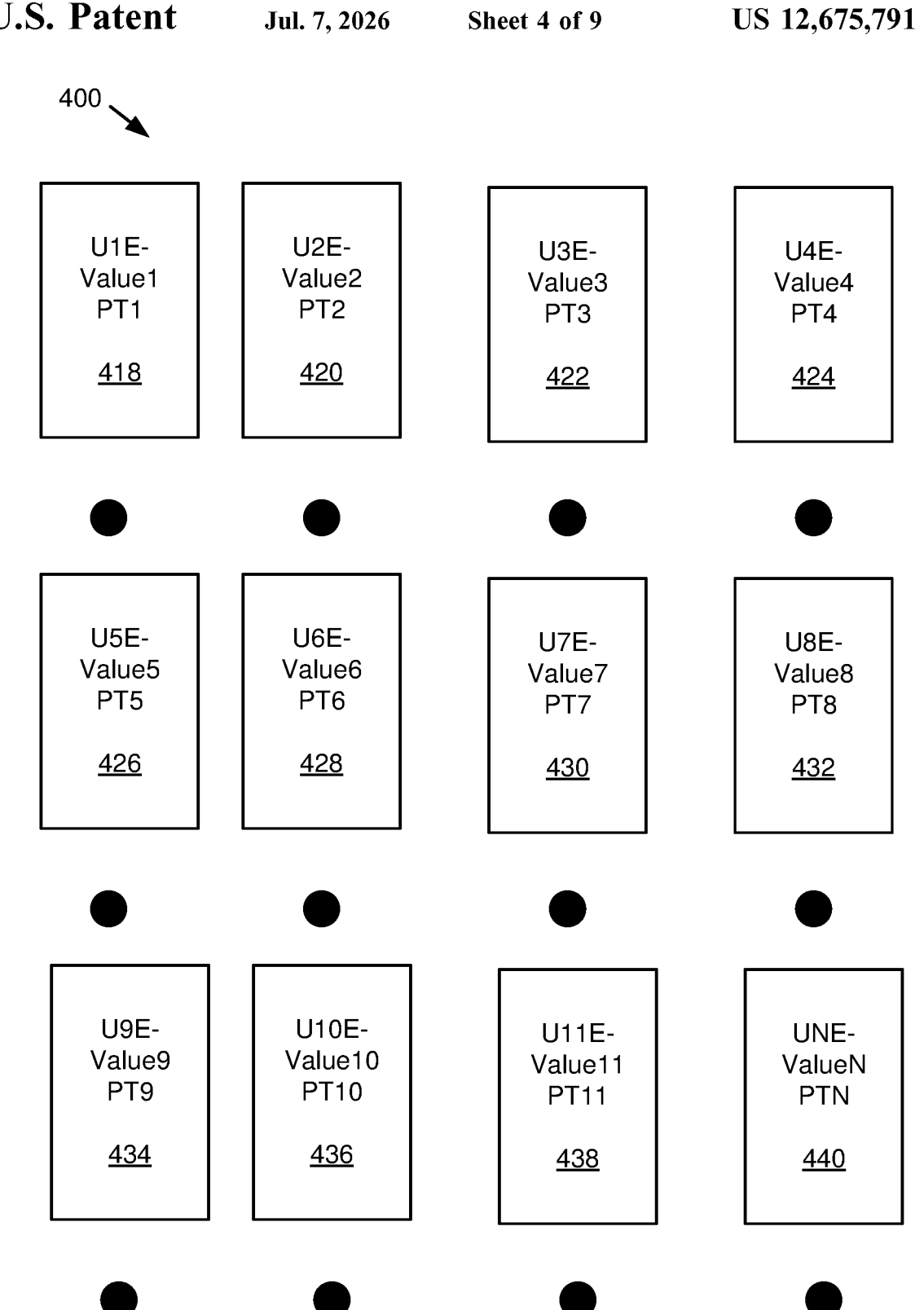
FIG. 4 is a block diagram illustrating sequential transaction blocks created for sequential transactions.

FIG. 4 shows an embodiment 400 illustrating nodes of E-Value designated to containers based on "preferences" of other types of context schema. In the illustrated embodiment, there are twelve types of preference types ("PT"), for example, PT1, PT2, PT3, PT4, PT5, PT6, PT7, PT8, PT9, PT10, PT11, and PTN. Each one of these preference types represents any number of preferences or options, based on which E-Value is separated before processing. E-Value may be separated and then aggregated for a collective purpose. The preferences, in an investment scenario, may be "short-term," "long-term," "philanthropy," and the like. As illustrated, containers for Users 1-N have E-Value in each. For example, U1 (user 1) has an E-Value for preference type one ("PT1") 418. As another example, U2 (user 2) has an E-Value for preference type two ("PT2") 420. As yet another example, U3 (user 3) has an E-Value for preference type three ("PT3") 422. As yet another example, U4 (user 4) has an E-Value for preference type four ("PT4") 424. For example, U5 (user 5) has an E-Value for preference type five ("PT5") 426. For example, U6 (user 6) has an E-Value for preference type six ("PT6") 428. For example, U7 (user 7) has a E-Value for preference type one ("PT7") 430. For example, U8 (user 8) has a E-Value for preference type eight ("PT8") 432. For example, U9 (user 9) has a E-Value for preference type nine ("PT9") 434. For example, U10 (user 10) has a E-Value for preference type ten ("PT10") 436. For example, U11 (user 11) has an E-Value for preference type one ("PT11") 438. For example, UN (user N) has an E-Value for preference type n ("PTN") 440.

Figure 5:
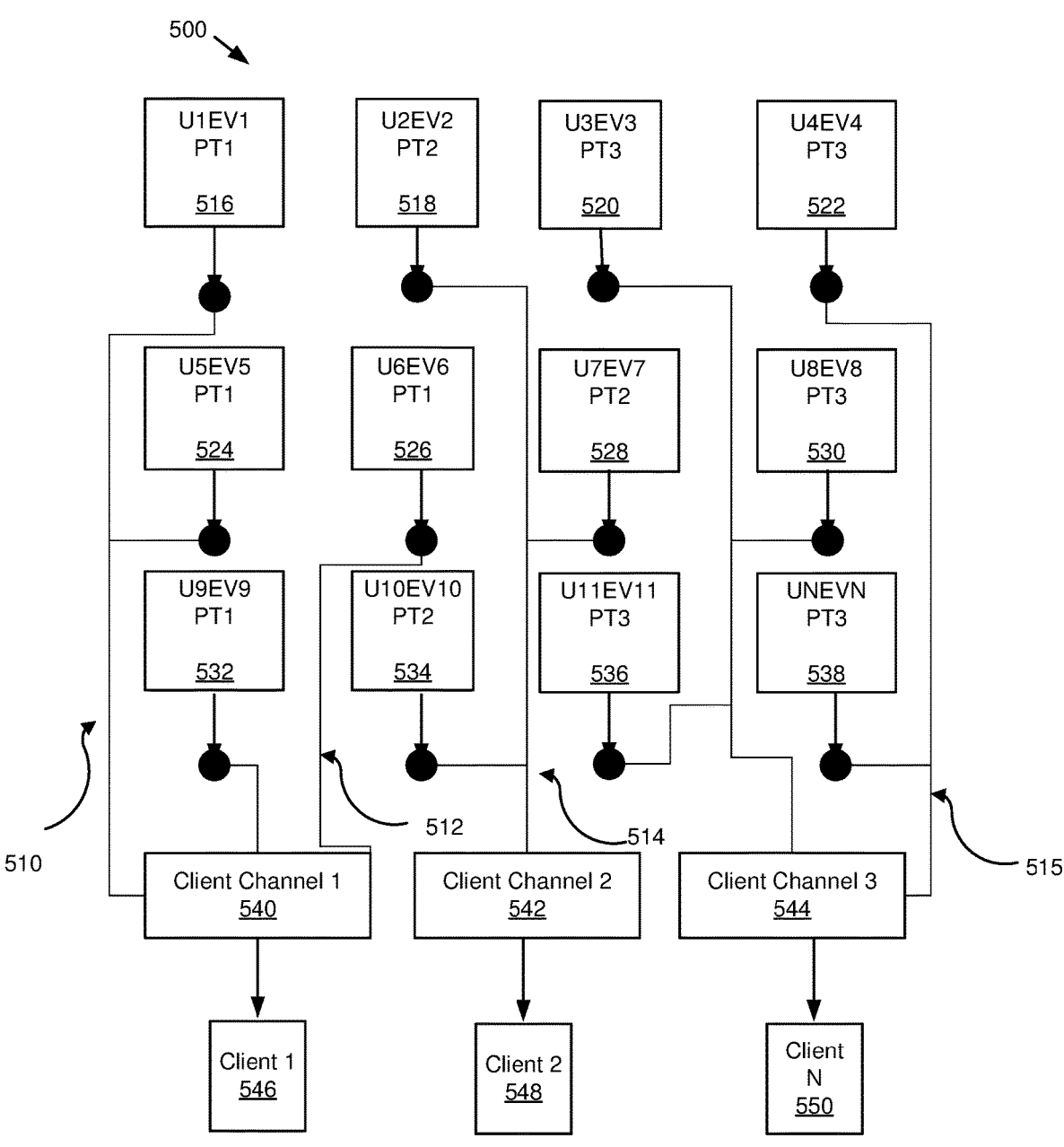
FIG. 5 is a block diagram illustrating flow of transactions into select trusted processing channels after validation by authorized parties (including off-chain authorization).

Referring now to FIG. 5, as illustrated in the embodiment 500, packets of E-Value (referenced as "EV" in this figure) many be aggregated and muted to the different secure transaction channels, 546, 548, and 550. For example, U1 (user 1) has an E-Value ("EV") for preference type one ("PT1") 516. As another example, U2 (user 2) has an E-Value ("EV") for preference type two ("PT2") 518. As yet another example, U3 (user 3) has an E-Value ("EV") for preference type three ("PT3") 520.

As yet another example, U4 (user 4) has an E-Value ("EV") for preference type three ("PT3") 522. For example, U5 (user 5) has an E-Value ("EV") for preference type five ("PT1") 524. For example, U6 (user 6) has an E-Value ("EV") for preference type one ("PT1") 526. For example, U7 (user 7) has a E-Value ("EV") for preference type one ("PT2") 528. For example, U8 (user 8) has a E-Value ("EV") for preference type eight ("PT3") 530. For example, U9 (user 9) has a E-Value ("EV") for preference type nine ("PT1") 532. For example, U10 (user 10) has a E-Value ("EV") for preference type ten ("PT2") 534. For example, U11 (user 11) has an E-Value for preference type one ("PT3") 536. For example, UN (user N) has an E-Value for preference type n ("PT3") 544.

According, as illustrated by flow paths 510 and 512. E-Value amounts from containers designating preference type one is taken and assembled to flow via flow paths 510 and 512 to Client 1 (546). As illustrated, the E-Value flow paths 510 and 512, of the packet for Client 1 (546), through client channel 1 (540) comprises E-Value amounts from the following containers: U1EV1 (516), U5EV5 (524), U9EV9 (532), and U6EV6 (526). As illustrated, in another example E-Value flow (514), the packet for Client 2 (548), through secure client channel 2 (542) comprises E-Value amounts from the following containers: U2EV2 (518), U7EV7 (528), and U10EV10 (534). As illustrated, in yet another example E-Value flow (515), the packet for Client N (550), through client channel 3 (544) comprises E-Value amounts from the following containers: U4EV4 (522), UNEVN (538), U3EV3 (520), U8EV8 (530), and U11EV11 (536). As illustrated packets are variously assembled by constraints that may be a preference type, a threshold amount, a period completion or the like.

Figure 6:
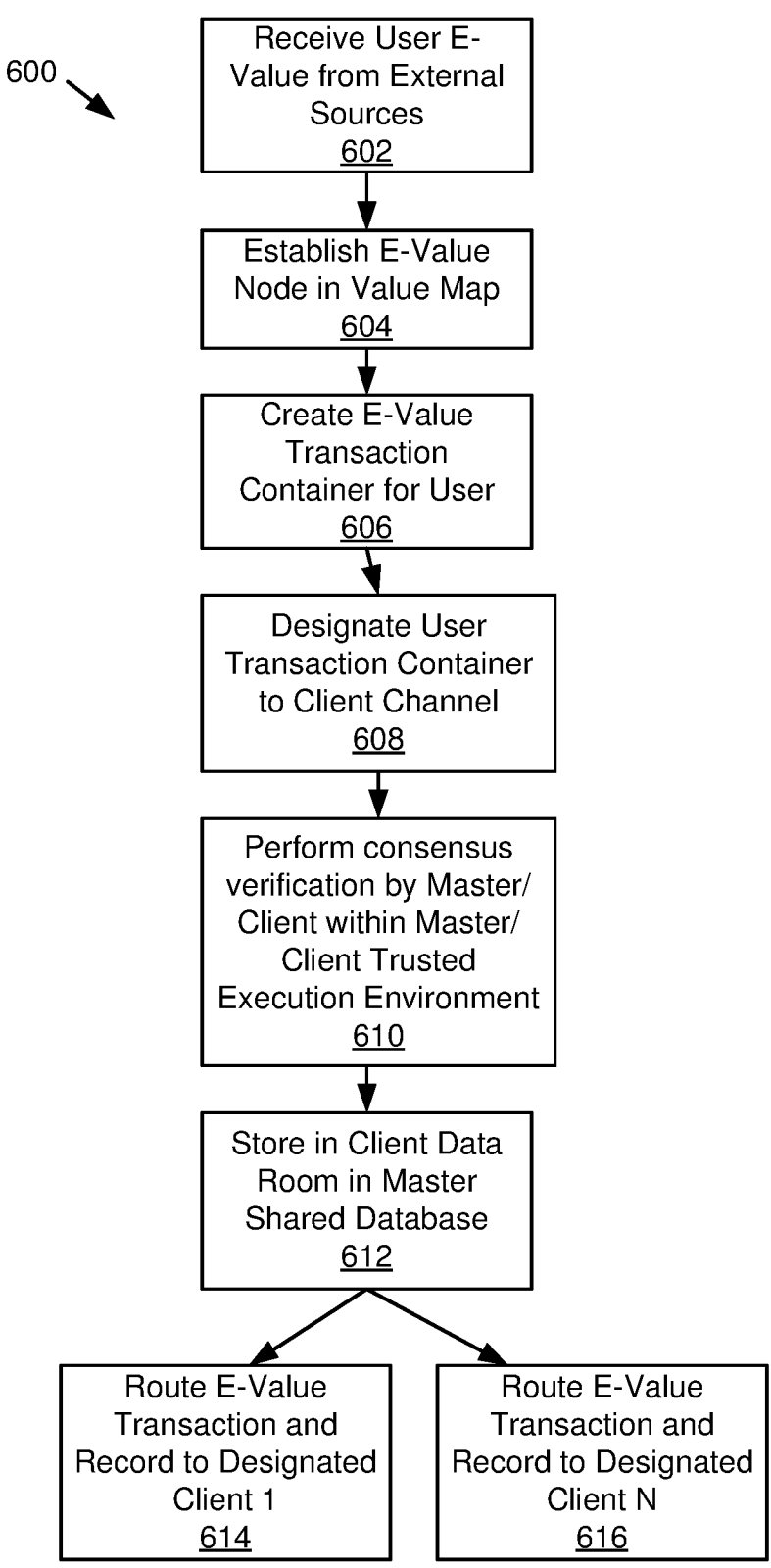
FIG. 6 illustrates a flow chart of the overall operations in accordance with the present invention.

Referring now to FIG. 6, the E-Value flow operations illustrated generally by reference numeral 600 begin operations at block 602, including one or more operations for receiving user allocated E-Value amounts from external sources (e.g., bank, credit cards, etc.). As illustrated above, an E-Value node is created or established in the instance this event occurs or a user sets up an account for this purpose, as described by block 604. The process 600 proceeds to the next block of operations 606, at which stage, the process creates an E-Value transaction container for the user. The process 600 flows to the next block of operations 608, including one or more operations for designating the user transaction container to a client channel, depending upon context schema, for example, a preference type. In one example scenario, where a user wants to allocate funds to an investment purpose, mainly for short-term use. The process 600 proceeds to the next block 610, including one or more operations for performing a "consensus" verification by the master processor 102 or a client processing device within the master or client trusted execution environment. As described above, different operations may be performed in either of the trusted execution environments to distribute control appropriately. The check-point object may set the constraints for these operations. The process 600 proceeds to the next block 612, including one or more operations for storing client data in a data room in the master shared database. The process 600 flows to the next blocks 614 and 616, respectively, whereby designated E-Value transactions and records are dispatched to a designated client (Client 1 through Client N), once they are unlocked for release.

Figure 7:
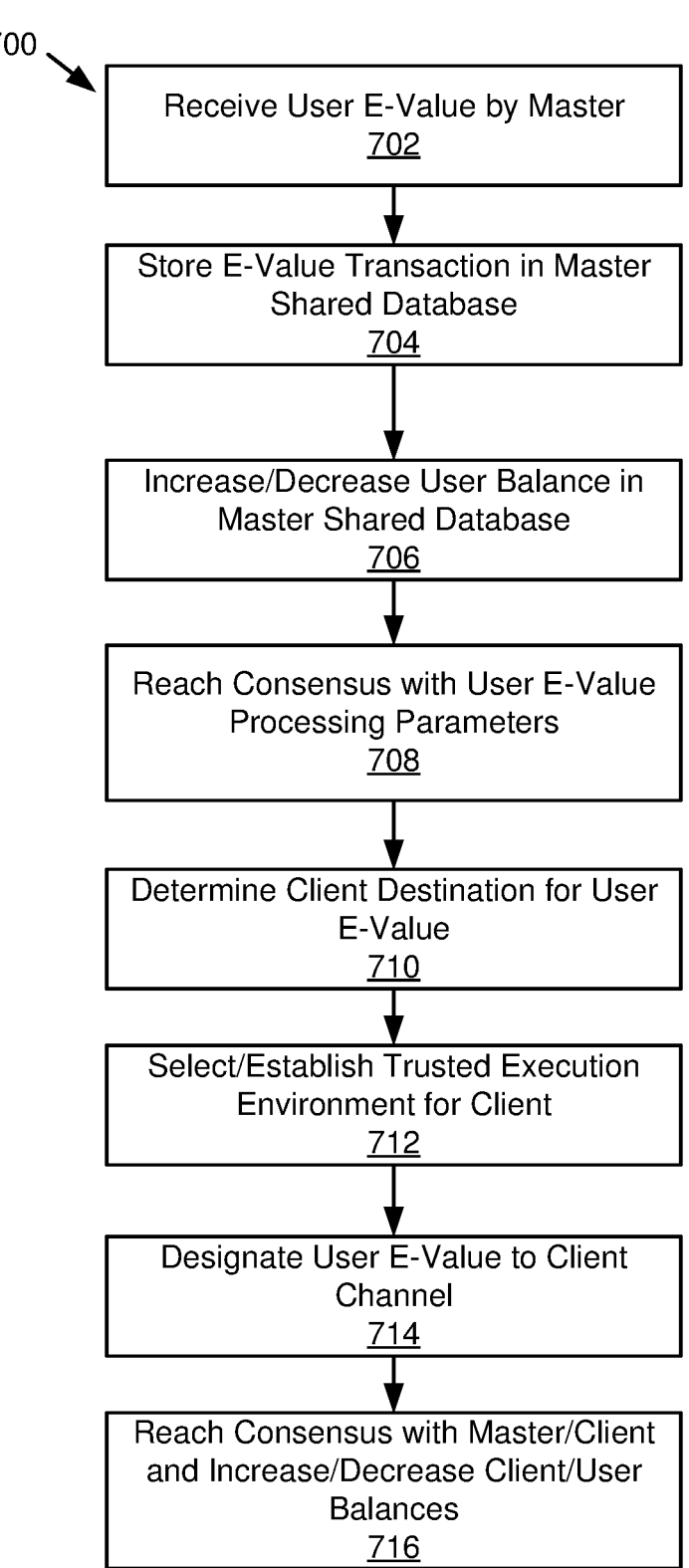
FIG. 7 illustrates a flow chart of the consensus protocols required in the trusted environments before payment amounts are unlocked and released.
Figure 8:
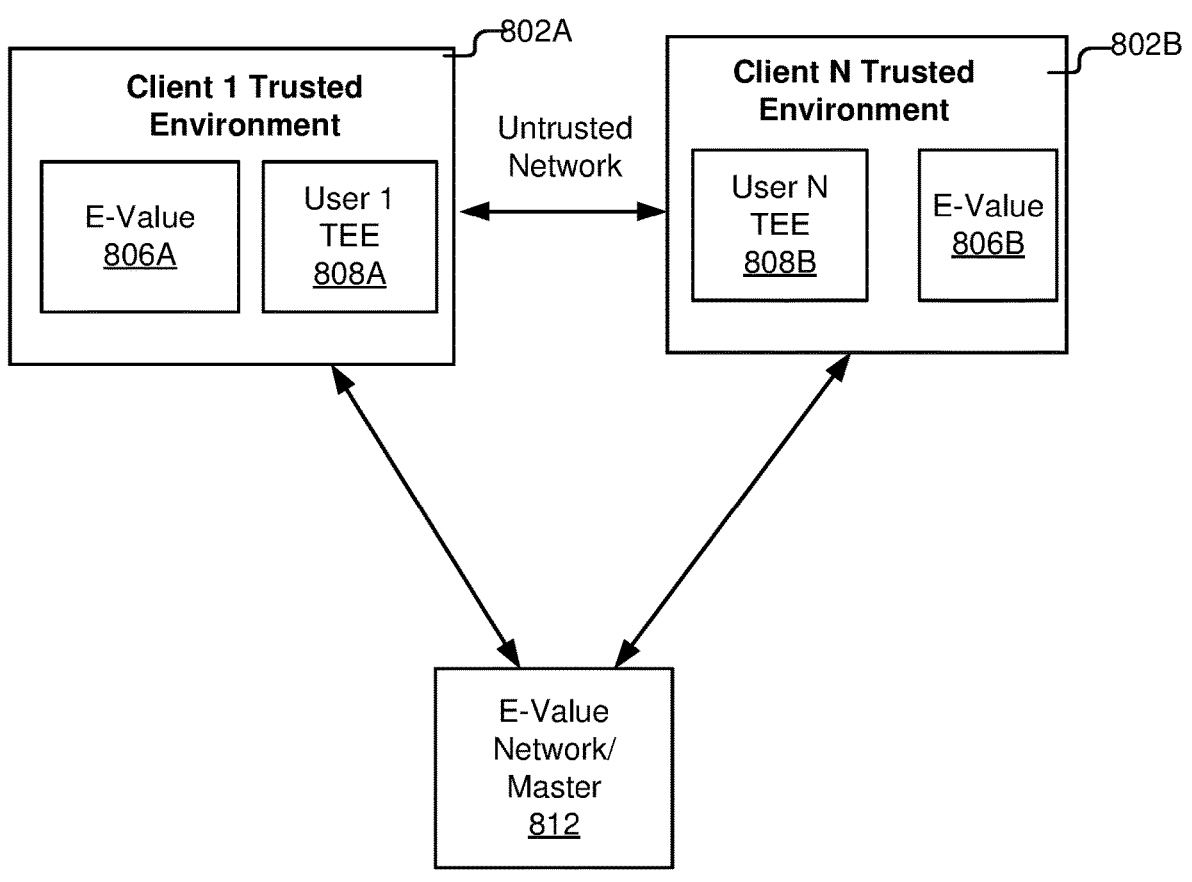
FIG. 8 illustrates a block diagram of the block transfer between client environments via a trusted network.

Referring not to FIG. 7, the process 700 to build consensus before action is executed begins at block 702, at which E-Value micro amounts are received by the master processor. This event may arrive sequentially from external sources reconciling (that user funds were sent and received). The E-Value transactions are stored by the master processor 102 in the master shared database 704. The process 700 flows to the next block 706, including one or more operations for increasing or decreasing user E-Value balances in the master shared database. The process 700 flows to the next block 708, including one or more operations for reaching consensus on user E-Value processing parameters (e.g., preference type etc.). The process 700 flows to the next block 710, including one or more operations for determining the client destination for the user E-Value. The process 700 flows to the next block 712, including one or more operations for selecting the trusted execution environment for the client for subsequent processing within the master-client secure enclave. The process 700 flows to the next block 714, including one or more operations for designating the E-Value to the Client channel in the trusted execution environment for the client. The process 700 flows to the next block 716, including one or more operations for reaching consensus with the master and client validating processors within the trusted execution environment for the client and increasing and decreasing the client and user balances within the master-client secure enclave. As further illustrated in FIG. 8, the trusted environments (802a and 802b) for any number of Clients (Client 1 through N) linked by untrusted networks communicate with a master processor with a E-Value network 812 to ensure secure transactions.

Figure 9:
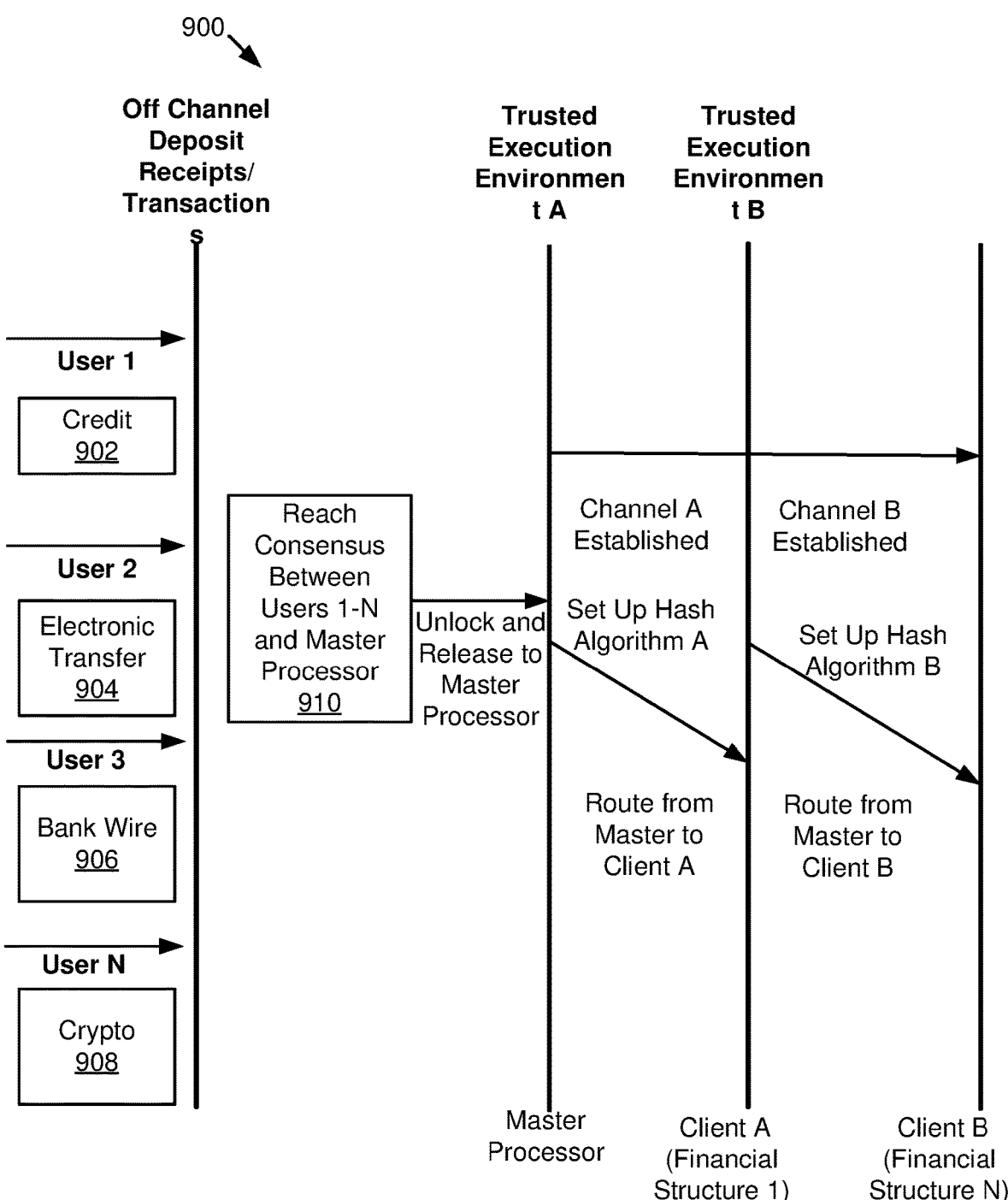
FIG. 9 is signaling diagram illustrating establishing, operation, and settlement phases of a protocol for implementing example blockchain transaction channels in trusted environments in accordance with the present invention.

Referring now to FIG. 9, the E-Value flow and transaction transfer and settlement process is illustrated by reference numeral 900. The off-channel processing including receipt of deposits and receipt transactions by any number of users (users 1-N), designated by reference numerals 902, 904, 906, and 908, respectively. The next phase covers building consensus between the users and the master processor 910. When consensus is reached that the user transfers are accurate (between the sender and receiver of funds), E-Value is unlocked and released to the master processor. The master processor in the instance of the events that users are opening accounts is informed of E-Value transactions. The next stage of operations includes setting up a trusted execution environment (e.g., tA or tB) when events command a transaction transfer. This may be based on context schema. As one example, a client destination may be determined by a preference type, for example when the E-Value is for a specific preference (e.g., a philanthropic cause). As another example, a client destination may be determined by a threshold amount (e.g., a threshold limit). Whatever the case, a channel is established, for example Channel A for a Client A, or Channel B for a Client B. The E-Value is routed from the master processor to Client A and from the master processor to Client B. In some embodiments, the hash algorithm for each client is different, for example, a hash algorithm A for Client A and a hash algorithm B for Client B. In one example, a hashing algorithm may be used to establish proof of chain of custody, proof of possession of a digital asset and/or proof against tampering. For example, the hashing algorithm may store the hash of a document. The hash of the document is a destructive process that uniquely identifies the document, however, does not allow the recreation of the document. Thus, the hashing algorithm may be used to store digital assets in the off-chain storage while establishing custody of digital assets that may include personally identifiable information. In an example, the hash may be used to verify the digital asset has not been modified or tampered with.

Each client is accorded a separate private key to unlock the E-Value packets. In each trusted environment, event objects are sequentially created and monitored by the master processor. During protocol execution in each trusted environment, participants may only access or modify any data the trusted environment, including in the associated memory or stored on disk, view or modify its application code, and control any aspect of its operating system and other privileged software and hardware. The protocols in each E-Value channel operates as follows:

First, pairs of participants perform remote attestation and open bidirectional E-Value. Before the master processor may send E-Value over a channel, it must provide a deposit in the form of an object transaction output paid into an associated bank or a unique address owned by the client. For each channel, the master trusted environment acts as a trusted intermediary by holding each client's channel deposits.

While the channel is open, the trusted environments securely maintain the channel state. E-Value transfers between the two parties may then be executed as long as the provided deposits are sufficient as collateral for the amounts transacted over the channel. The corresponding updates to the internal channel state are performed through a secure interface. The trusted environments maintain all channel balances and the deposits of all trusted environment participants exclusively within them.

A participant may, at any point in time, issue the termination of any of their E-Value channels. This may be due to mutual agreement with the master processor. The master processor may route payments across multiple E-Value channels. If routing of the E-Value fails, e.g., due to node or network failures, the master processor ensures that all channels of the E-Value chain are settled consistently either at their pre-payment state or at their post-payment state, depending on the stage that the protocol execution reached at time of failure.

A participant "Client 1" wishes to participate in this trusted environment space and protocol must be uniquely identifiable by all other participants to the end of sending and receiving E-Value. At setup, Client 1 is accorded a private key for the purpose of identification within the trusted network. The private key is securely held inside the trusted environment, inaccessible to other clients. The master processor performs remote attestation inside each trusted environment. Specifically, for Intel SGX, remote attestation requires communication with a third-party attestation service IAS. While the master processor may perform this communication outside the trusted environment, it verifies the attestation service's report and the corresponding signature inside the trusted environment.

Once remote attestation has been successfully completed, the secure network channel is established. The trusted environment also agrees on a unique channel ID to identify the E-Value channel. The master and the client may settle the channel according to its current state at any point in time. Depending on the balances in the E-Value payment channel, the trusted environment generates and returns a settlement transaction that redistributes the current balances into the addresses given at channel setup.

It should be recognized that the balance on the channel is backed by deposit transactions placed by the master and clients. For every deposit associated with the channel at a given time, the master has either created it or has approved it, given the commitment from the client.

The transaction processing system as disclosed herein may be implemented using one or more processing platforms, or portions thereof. For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks. The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Other types of virtualizations may additionally or alternatively be used in a given processing platform in illustrative embodiments. For example, Docker containers or other types of containers implemented using respective kernel control groups of an operating system of a given processing device may be used. It is also possible for such containers to run on virtual machines controlled by a hypervisor.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory. The trusted execution environment in some embodiments comprises an Intel SGX-based secure enclave. SGX comprises a set of instructions that confer hardware protections on user-level code. For example, an SGX-based secure enclave isolates code and data using hardware mechanisms in the CPU. Assuming the physical CPU package is not breached, SGX-based secure enclaves are protected from an attacker with physical access to the machine, including access to the memory, the system bus, BIOS, and peripherals. A given one of the user environment processing devices in some embodiments is configured to execute one or more sets of process code associated with payment channel functionality in an SGX-based secure enclave of its corresponding trusted execution environment. Such an arrangement protects the given user environment processing device against malicious processes as well as the host operating system, and can allow the processing device to attest to a remote client that the client is interacting with a legitimate, SGX-backed instance of the process code. During execution, enclave code and data reside in a region of protected memory called the enclave page cache (EPC). When enclave code and data is resident on-chip, it is guarded by CPU access controls; when it is flushed to DRAM or disk, it is encrypted. A memory encryption engine encrypts and decrypts cache lines in the EPC as they are written to and fetched from DRAM. Enclave memory is also integrity-protected, ensuring that modifications and rollbacks can be detected, and the enclave can terminate execution. Only code executing inside the enclave is permitted to access the EPC. Enclave code can, however, access all memory outside the enclave directly. As enclave code is always executed in user mode, any interaction with the host OS through system calls, e.g., for network or disk I/O, must execute outside the enclave. Invocations of the enclave code can only be performed through well-defined entry points under the control of the application programmer.

In addition, SGX supports remote attestation, which enables an enclave to acquire a signed statement from the CPU that it is executing a particular enclave with a given hash of memory, known as a quote. A third-party attestation service, e.g., as provided by the Intel Attestation Service (IAS), can certify that these signed statements originate from authentic CPUs conforming to the SGX specification.

It is to be appreciated that illustrative embodiments are not limited to use of the above-described SGX-based secure enclaves. For example, the trusted execution environments may be implemented as another type of trusted execution environment, such as an ARM TrustZone trusted execution environment. The term "trusted execution environment" as used herein is therefore intended to be broadly construed.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

What is claimed is:

1. An electronic value transaction flow processing system, comprising:
   a hardware processor;
   a cloud-based network coupled to the hardware processor and comprising a first trusted master execution environment designated within it;
   an event object and tag generator generating an object for each separate digital transaction event that occurs within the first trusted master execution environment, a corresponding event object having a unique address and tag designating a target trusted environment for processing, wherein particular digital transaction events are securely processed within the first trusted master execution environment;
   a check-point engine coupled to the event object and tag generator and operable in a processing sequence to designate a particular event object as a check, the particular event object comprising machine-readable instructions operable to execute automatically, upon meeting predetermined conditions, triggering a next action within the first trusted master execution environment to enforce one or more conditions that must be satisfied before a subsequent automated action in the processing sequence is executed; and
   a non-transitory computer readable medium storing machine-readable instructions that when executed by the hardware processor cause the processor to:
      receive a plurality of data inputs representative of electronic micro value amounts transmitted from a plurality of electronic devices of individual client users as separate digital transaction events in the first trusted master execution environment for performing one or more secure digital transaction functions;
      allocate a side operation within the first trusted master execution environment for building consensus from external sources that are granted access to the master execution environment and to unlock release of micro value amounts responsive to reaching consensus;
      apply a master module within the first trusted master execution environment to receive the consensus to validate the data inputs representative of electronic value amounts within the first master execution trusted environment;
      establish, via the master module, a plurality of separate trusted client environments for performing secure digital transactions with a plurality of client servers, each trusted client environment being cryptographically isolated and configured with a hashing algorithm that is different for each different one of the plurality of client servers;
      direct flow of the data inputs representative of electronic micro value amounts to the separate trusted client environments based on a machine-enforceable context schema associated with the corresponding event objects; and
      establish a plurality of secure, authenticated channels for flow of the data inputs representative of electronic value amounts to one or more clients based on building consensus with the one or more client servers within the trusted execution environments.

2. The electronic value transaction flow processing system according to claim 1, wherein the plurality of secure channels are bidirectional channels that maintain channel state within the corresponding trusted execution environments until a consensus-triggered unlock is performed for flow of the data inputs representative of electronic value amounts.

3. The electronic value transaction flow processing system according to claim 1, wherein the plurality of secure channels are established after the data inputs representative of electronic micro value amounts are aggregated in the master trusted execution environment to meet client server defined constraints.

4. The electronic value transaction flow processing system according to claim 3, wherein the client server defined constraints specify a threshold limit set in the context schema and enforced by the check-point engine prior to channel unlock.

5. The electronic value transaction flow processing system according to claim 3, wherein the client server defined constraints specify an asset growth purpose encoded in the context schema that determines a designated client trusted environment.

6. The electronic value transaction flow processing system according to claim 1, wherein the data inputs representative of electronic micro value amounts are indicative of digital asset transfer from another entity, the transfers being validated by the master module using side operation consensus prior to routing.

7. The electronic value transaction flow processing system according to claim 1, wherein the data inputs representative of electronic micro value amounts represent deposited digital transactions by a credit card payment processor whose receipt events are recorded in the master shared database prior to aggregation.

8. The electronic value transaction flow processing system according to claim 1, wherein the master module control limits access by client servers only to the separate trusted client environments and to a sequence of event objects within separate trusted client environments using private keys managed by the master trusted execution environment.

9. The electronic value transaction flow processing system according to claim 1, wherein the master module comprises the check-point engine and is configured to designate events for processing within the first trusted master execution environment and to inject intelligent code into designated check-point event objects to regulate subsequent automated actions.

10. The electronic value transaction flow processing system according to claim 9, wherein the check-point engine designates records for recording in a distributed ledger and commits immutable state snapshots responsive to consensus while retaining off-chain state within the trusted execution environments.

11. A method, comprising:

in a computing system with a hardware processor and a cloud-based network comprising a first trusted master execution environment; and further:

generating, via an event object and tag generator, an event object for each separate digital transaction event that occurs within the first trusted master execution environment, each event object having a unique address and an associated context schema, a particular digital transaction events securely process within the first trusted master execution environment;

operating a check-point engine coupled to the event object and tag generator to designate a particular event object as a check, the particular event object comprising machine-readable instructions operable within the first master execution environment to enforce one or more conditions that must be met before a subsequent automated action in a processing sequence is executed; and executing, by the hardware processor, machine-readable instructions to perform functions comprising:

receiving a plurality of data inputs representative of electronic micro value amounts transmitted from a plurality of electronic devices of individual client users as separate transaction events in the first trusted master execution environment for performing one or more secure transaction functions;

allocating a side operation within the first trusted master execution environment for building consensus from external sources that have access to the master execution environment;

unlocking release of micro value amounts responsive to consensus;

applying a master module within the first trusted master execution environment to receive the consensus to validate the data inputs representative of electronic value amounts within the first master execution trusted environment and to configure, for each different client server, a different hashing algorithm within a corresponding trusted client environment;

establishing a plurality of separate trusted client environments for performing secure digital transactions within one or more client servers, each trusted client environment being cryptographically isolated and addressable by a unique channel identifier;

directing flow of the data inputs representative of electronic micro value amounts to the separate trusted client environments based on the context schema stored for the corresponding event objects; and establishing a plurality of secure channels for flow of the data inputs representative of electronic value amounts to the one or more clients based on building consensus with the one or more client servers within the trusted execution environments.

12. The method according to claim 11, wherein the plurality of secure channels are bidirectional channels whose current balances are maintained exclusively within the trusted execution environments until settlement.

13. The method according to claim 11, wherein the secure channels are established after the data inputs representative of electronic micro value amounts are aggregated in the master trusted execution environment to meet client server defined constraints specified in the context schema.

14. The method according to claim 13, wherein the client server defined constraints specify a threshold limit that the check-point engine enforces before authorizing a subsequent automated action.

15. The method according to claim 13, wherein the client server defined constraints specify an asset growth purpose that determines routing to a designated client trusted environment.

16. The method according to claim 11, wherein the data inputs representative of electronic micro value amounts are indicative of digital assets transfer from another entity and are verified off-chain by external processors prior to unlock.

17. The method according to claim 11, wherein the data inputs representative of electronic micro value amounts represent deposited digital transactions by a credit card payment processor, and receipt events are stored in a master shared database for subsequent consensus and routing.

18. The method according to claim 11, wherein the master module control limits access by client servers only to their separate trusted client environments and to a sequence of event objects in the separate trusted client environments using private keys granted and revoked by the master trusted execution environment.

19. The method according to claim 11, wherein the master module comprises the check-point engine and designates events for processing within the first trusted master execution environment by injecting intelligent code into designated event objects to govern state transitions.

20. The method according to claim 11, wherein the check-point engine designates records for recording in a distributed ledger and anchors channel state by storing hashes as proof of custody and integrity for off-chain digital assets associated with the event objects.

\* \* \* \* \*